Nov. 19, 1963 L. J. CAPRAROLA 3,110,984

APPARATUS FOR BEVELING THE EDGES OF CERAMIC DISKS

Filed Sept. 19, 1961 3 Sheets-Sheet 1

INVENTOR.
LEROY J. CAPRAROLA
BY
William A. Zalesak
ATTORNEY

APPARATUS FOR BEVELING THE EDGES OF CERAMIC DISKS

Filed Sept. 19, 1961 3 Sheets-Sheet 2

INVENTOR.
LEROY J. CAPRAROLA
BY
William A. Zalesak
ATTORNEY

Nov. 19, 1963 L. J. CAPRAROLA 3,110,984

APPARATUS FOR BEVELING THE EDGES OF CERAMIC DISKS

Filed Sept. 19, 1961 3 Sheets-Sheet 3

INVENTOR.
LEROY J. CAPRAROLA
BY
William A. Zalesak
ATTORNEY 3,110,984
Patented Nov. 19, 1963

3,110,984
APPARATUS FOR BEVELING THE EDGES OF CERAMIC DISKS

Leroy J. Caprarola, Morris Township, Morris County, N.J., assignor to Radio Corporation of America, a corporation of Delaware Filed Sept. 19, 1961, Ser. No. 139,179
3 Claims. (Cl. 51—88)

This invention relates to apparatus for removing the sharp edges from the peripheries of circular ceramic disks or wafers.

In a certain type of vacuum tube, a ceramic wafer, having holes therethrough, serves as a base and support for the tube elements, the leads and supports for the tube elements extending through these holes. In a later step of assembly of such a tube, the wafer which has the tube element or electrodes mounted thereon is put into the tube envelope, completing the tube mount enclosure. These ceramic wafers are made by compressing a ceramic powder into disk shape, and with the holes therein, in a mold. As molded, the green or unfired wafer has sharp peripheral edges. While the green wafer has sufficient physical strength to withstand a certain amount of handling, it will have the requisite physical strength to act as an electron tube base only after being fired.

The above referred to type of vacuum tube is assembled by inserting tube elements into a jig. The fired wafer or disk is then placed in the jig. The leads and support conductors are inserted into the holes in the wafer after the wafer is positioned in the jig. The jig is then put in a brazing furnace. After brazing the leads and support legs to their elements and to a metal lining in the holes in the wafer, an assembly is produced comprising tube elements mounted on the wafer. This tube assembly is then inserted into a metal enclosure that fits the wafer closely. Due to this close fit, it is difficult to insert a tube element assembly mounted on the disk into the tube envelope. Furthermore, the wafer edges, being sharp, cause considerable wear and even cutting of the gloves (or fingers if no gloves are worn) of the operators who perform the above-mentioned assembly steps. It has been found that if the edges of the ceramic wafers or disks are bevelled, less skill is required in fitting the disks into the jig and later in fitting the assembly of tube elements with the wafer into the tube envelope. Also, the wear on the operator's glove is reduced and the cutting thereof or of the operator's fingers is eliminated.

The ceramic disks, or wafers, used as a part of the above-mentioned type of vacuum tube are very small. They may be ⅜ of an inch in diameter and about 1/16 of an inch thick. Therefore, removing the sharp edges thereof by hand, in a uniform manner, is a time-consuming, tedious task requiring skilled operators. The fired wafer is much harder than the green wafer and therefore removing the sharp edges from a green wafer requires extra care so as not to damage or break the disk, while removing the sharp edges from a fired wafer requires use of hard abrasives and results in quick wear of the abrasive used. Furthermore, if an attempt is made to remove the sharp edges of the unfired wafer by tumbling, the wafer may be damaged. If the fired wafer is tumbled to remove the sharp edges, other portions of the surface of the wafer may be removed by the tumbling and the glaze put on the wafer by firing may be removed from the edges and from portions at the surface of the wafer.

It is therefore an object of this invention to provide an apparatus that will remove the sharp edges from disks and cylinders and that requires a minimum of attention once the apparatus is set up and started.

It is another object of this invention to provide an apparatus that will uniformly and evenly and smoothly bevel the edges of ceramic disks.

It is a further object of this invention to provide an apparatus for bevelling the edges of green ceramic disks without damaging or destroying them.

According to this invention, ceramic disks, once they are formed, and before they are fired, are caused to roll and the sharp edges thereof are abraded away as the disks are rolled. The apparatus of this invention comprises a rectangular channel-shaped guide along which the disks are rolled. This guide has cut-away portions along the length thereof, one in each lower corner of the guide, whereby one cut-away portion exposes one edge of the disks that moves along the guide and another cut-away portion exposes the opposite edge of the disks. Abrasive means are applied to each exposed edge of the disks through the cut-away corners. As the disks roll along the guide, different portions of the edges of the disk are exposed to the edge of the abrasive means. The cut-away portions of the guide are made long enough so that the entire peripheral edges of the disk are exposed to the abrading means whereby the entire peripheral edges of the disk are bevelled. Since the disk is green when its edges are bevelled, each abrasive means may comprise a wire wheel. A properly chosen wire wheel will clean itself of ground away portions of the disk. If it is desired to bevel the edges of fired ceramic disks, abrasive means suitable for this task are used.

This invention is described in detail in the following description, and the apparatus thereof is shown in the accompanying drawing in which.

Figure 1:
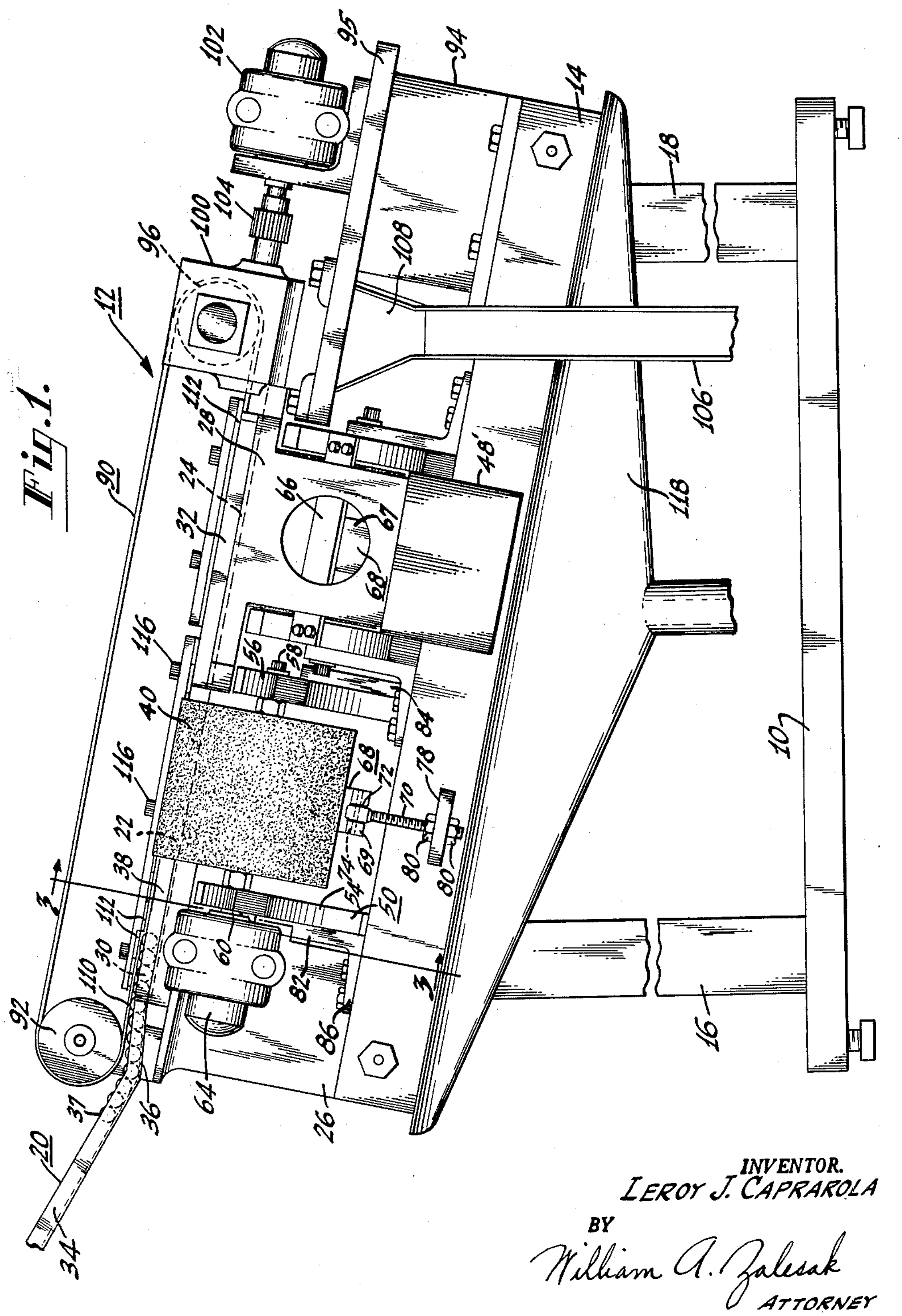
FIG. 1 is a side elevation of the apparatus of the invention.
Figure 2:
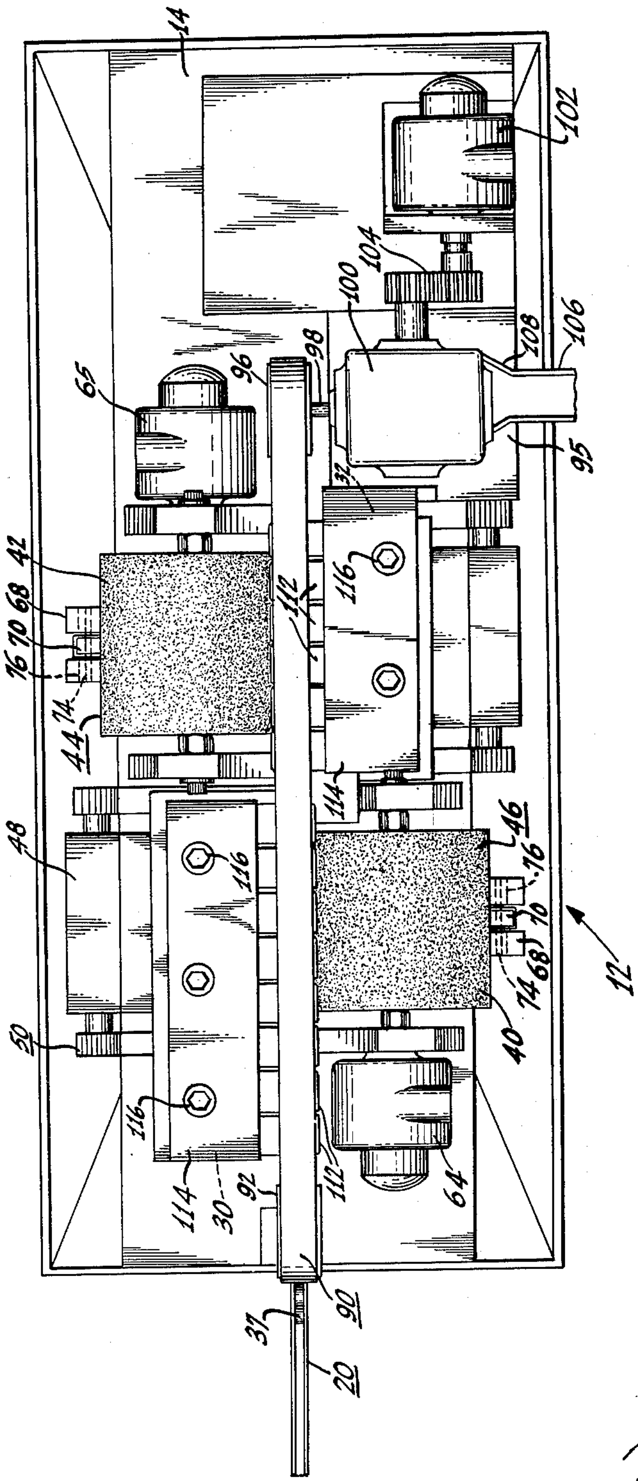
FIG. 2 is a top or plan view of the apparatus of FIG. 1.

Turning to FIGS. 1 and 2 a base 10 is provided on which the apparatus of this invention, generally indicated as 12 is mounted. A support plate 14, which may be a section of channel iron, is supported on pairs of legs 16 and 18 fastened to the base 10, one pair 18 of which being shorter than the other pair 16 thereof to provide the desired tilt of the corner abrading apparatus 12.

A U-shaped guide 20, having the cut-away (or absent) corners 22 and 24 (FIG. 3) is mounted on a pair of flanges 26 and 28 (FIGS. 1 and 3) which in turn are mounted on the support 14. The first flange 26 extends from the left end of the support 14, as shown in FIG. 1, and is positioned to one side, the left, of the longitudinal center of support 14 as viewed in FIG. 3. The second flange 28 is mounted at about the transverse center of the support 14 as shown in FIG. 1, but is positioned to the other side, the right, of the longitudinal center of the support 14, as viewed in FIG. 3. Separators 30 and 32 are respectively mounted on flanges 26 and 28, and the guide 20 is mounted along a longitudinal center line of the support on and to the other side, the right, of flange 26 and on and to the outside, the left, of flange 28, as viewed in FIG. 3. By provision of separators 30 and 32 of different thicknesses, disks of different diameters may be processed as will be explained.

Figure 3:
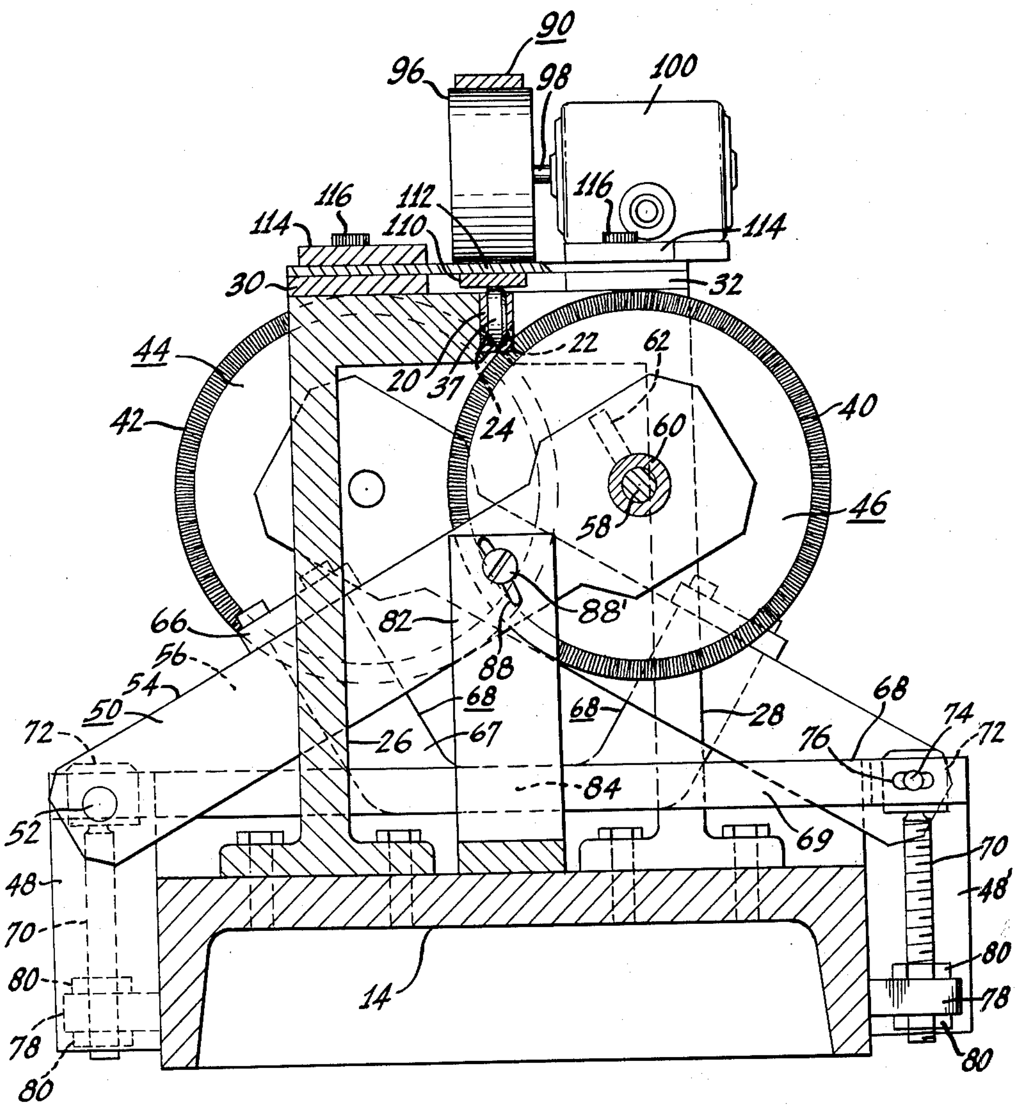
FIG. 3 is a section taken on the line 3—3 of FIG. 1.

The guide 20 comprises three portions 34, 36 and 38. The first, or inlet portion 34, extends downwardly at any convenient angle from the machine (not shown) for making the wafers, the corners of which are to be removed. The second, or feed portion 36, extends downwardly from the end of the first portion 34, but at a lesser slope for a purpose to be described. The third, or work portion 38, extends downwardly from the end of the second portion but in a direction parallel to the top of the flanges 26 and 28 at a slope between those of the other two portions. The third work portion of the guide has therein the cut-away portions 22 and 24 at lower corners and at opposite sides thereof, as shown in FIG. 3, and wire wheels 40 and 42 extend into the respective cut-away portions 22 and 24 of guide 20 and into wafer cutting relation to the wafers in the guide 20 as will be explained.

The abrading means here shown comprise wire wheels 40 and 42 and are mounted in an adjustable manner on the support. A first upstanding support 48 (FIG. 3) is mounted on the edge of support 14 and on the same side of the center thereof as the first flange 26. A frame 50 is pivoted at the top of the upstanding support 48 on pin 52. Abrasive means (a wire wheel) 40 is mounted for rotation between the legs 54 and 56 of the frame 50. One of the legs 56 has a bearing therein for rotatably supporting one end of the axle 58 of the wire wheel 40. The other leg 54 of the frame 50 has a larger hole therein and set screw 62 for holding a portion 60 of the frame of a motor 64, here shown as an air motor 64, which is mounted on the arm 54 of the frame 50. In this manner the motor 64 is mounted on leg 54 of frame 50.

A cross piece 66 is fastened across the legs 54 and 56 comprising the frame 50. One end of a bent lever arm 68 is fixed to the cross piece 66. One part 67 of bent lever 68 extends downwardly to the right (FIG. 3) and another part 69 of bent lever 68 extends horizontally beyond the support plate 14 in a direction away from the upstanding support 48. A bolt 70 fits in a vertical slot 72 in the extended end of the horizontal portion 69 of lever 68 and a pin 74 extends through the head of the bolt 70 and through the end of the horizontal portion 69 whereby the bolt 70 cannot rotate about its own axis. A slot 76 is provided in lever portion 69 for pin 74 to permit adjustment of the position of lever 68. The bolt 70 extends through a lateral extension 78 of support 14 and is locked in an adjusted position with respect thereto by nuts 80. A cut-away portion 22 of the guide 20 registers with wire wheel 40. In this manner, the frame 50 and therefore, the wire wheel 40 carried thereby is adjusted so that the periphery of the wheel 40 extends a desired amount into the guide at this cut-away portion 22 thereof.

Angle irons 82 and 84 are provided for locking the frame 50 in adjusted position. A flange of angle irons 82 is fixed to the support plate 14 as shown at 86 (FIG. 1), and the other flange thereof is adjacent to the leg 54 of the frame 50. An arcuate slot, such as slot 88 in flange 82 (FIG. 3), is provided in the flange, and a cap screw, such as 88' (FIG. 3), extends through the slot into the leg 54 of the frame 50. A further angle iron 84 is provided adjacent leg 56. Upon tightening of the cap screws 88', which extend through the angle irons 82 and 84 (only one cap screw being shown), the adjusted position of the frames and therefore of the wire wheels is fixed.

A further abrading means 44 is provided in registry with the further cut-away portion 24 of the guide 20. This further abrading means 44 is mounted, powered, adjusted in position and fixed into position similarly to the first abrading means. Therefore, no detailed description thereof appears necessary. The upstanding support 48' for the further frame is shown in FIGS. 1 and 3.

Means are provided for rolling the wafers along the guide and for holding them down in the guide as they roll therealong. This means comprises a drive belt 90 mounted for wafer contact and is positioned just above the guide portions 36 and 38.

The belt mounting means comprises a pulley 92 mounted on the first flange 26 and positioned over the guide portions 36 and 38 and mounted for rotation about an axis perpendicular to the longitudinal axis of guide portion 38. A third flange 94 is mounted at the right hand side, as viewed in FIG. 1, of the support plate 14. This flange supports a table 95 which in turn supports a second pulley 96 for the belt 90. This second pulley 96 is mounted on an axle 98 (FIG. 2) extending from speed change mechanism 100 which is fixed to the top of the table 95. A motor 102 (FIGS. 1 and 2) here shown as an air motor, and gears 104 for driving the pulley 96 are also mounted on the table 95. A chute 106 having a funnel-like top portion 108 is also supported on the table 95, for receiving wafers from the lower end of the guide 20. The belt 90 extends over the two pulleys 92 and 96, the lower half or portion 110 of the belt being closely parallel to and overlying the open, upper edge of the guide 20. Pressure fingers 112 are mounted on the spacers 30 and 32 and extend into contact with the upper surface of the portion 110 of the belt 90. The pressure fingers 112 are held in place by pressure plates 114 and cap screws 116 extending through the pressure plates 114 and into the flanges 26 and 28. Since, as shown in FIGS. 1 and 3, the wafers 37 extend above the top of guide 20, the upper periphery of the wafers are moved along the guide 20 by the portion 110 of the belt 90 when moved in the proper direction by the motor 102. The fingers 112 pressing down on the belt portion 110 hold the wafers down in the guide by means of the intervening belt portion 110. Thereby, as the wafers, in rolling down the guide 20, pass the wire wheels 40 and 42 the corners of the wafers are cut away.

As noted above, the feed portion 36 of the guide 20 extends at an angle to the top of the flange 26 and 28. As seen in FIG. 1, the feed portion 36 of the guide 20 forms a small angle with belt portion 110, so that the feed portion 36 approaches the belt 110 gradually. In this manner the wafers, as they roll down the guide are gently and gradually brought into contact with the belt 90, so that the first contact of the belt on the green wafers will not injure them.

A funnel 118, to which vacuum may be applied, if desired, is provided for gathering the dust produced by the grinding operation.

The operation of this apparatus is as follows: Vacuum is applied to the funnel 118. The motor 102 is started in such direction that it drives the belt 90 so that its lower portion 110 moves along the wafer or cylinder guide from left to right as viewed in FIG. 1. The motors 64 and 65 coupled to the wire wheels 40 and 42 are started in such direction that the tops thereof turn toward the wafer guide 20. The wafers are deposited therein by hand or by being fed from a wafer making machine (not shown) into the inlet portion 34 of the guide 20. The wafers roll down the guide 20 and along the second feed portion 36 of the guide where the tops of the wafers which extend above the top of the guide 20 are brought into contact with the belt portion 110. The wafers continue to roll down the guide 20, being driven down along the work portion 38 of the guide 20 by means of the moving belt 90. The moving belt 90 between the pulleys 92 and 96 is kept in contact with the wafers by the resilient pressure fingers 112 to positively rotate or roll the wafers along their path of travel. The position of the resilient fingers 112, and therefore of the portion 110 of the belt 90 below the pulleys 92 and 96, may be adjusted for various diameter disks 37, by using spacers 30 and 32 of various thicknesses. As the wafers pass by the cut-away portions of the guide, the peripheral edges of the wafers are exposed to and are removed by the wire wheels 40 and 42 which extend into the guide 20 at the cut-away portions 22 and 24 thereof. Since the two peripheral edges are exposed to the wire wheels, one at each cut-away portion of the guide, both peripheral edges of the wafer are cut away. The wafers, after their edges are cut away, are dropped into the chute 106. In the meantime the dust produced by operation of the machine is taken away by the funnel 118.

What is claimed is:

1. Apparatus for beveling a work piece comprising an elongated channel-shaped guide adapted to receive and support said work piece therein, said guide having two substantially parallel sides extending substantially the entire length of said guide, and a third side joining said parallel sides, whereby two corners are provided, said guide being cut away for a portion of its length along one of said corners, a first abrasive means positioned to extend into said guide through said cut away portion, said guide being cut away at a further portion of its length along the other of said corners and a second abrasive means positioned to extend into said guide through said further cut away portion of its length.

2. Apparatus for beveling a work piece comprising an elongated channel-shaped guide adapted to receive and support said work piece therein, said guide having two substantially parallel sides extending substantially the entire length of said guide, and a third side joining said parallel sides, whereby two corners are provided, said guide being cut away for a portion of its length along one of said corners, an abrasive means having a cylindrical periphery and having an axis parallel to the length of said guide, a portion of the cylindrical periphery of the abrasive means extending into said guide through the cut away portion thereof, said guide being cut away at a further portion of its length along the other of said corners and a second abrasive means having a cylindrical periphery and having an axis parallel to the length of said guide, a portion of the cylindrical periphery of said second abrasive means extending into said guide through the further cut away portion thereof and means for rotating said abrasive means about their axes.

3. Apparatus for beveling a work piece comprising an elongated channel-shaped guide adapted to receive and support said work piece therein, said guide having two substantially parallel sides extending substantially the entire length of said guide, and a third side joining said parallel sides, whereby two corners are provided, said guide being cut away for a portion of its length along one of said corners, an abrasive means having a cylindrical periphery and having an axis parallel to the length of said guide, a portion of the cylindrical periphery of the abrasive means extending into said guide through the cut away portion thereof, said guide being cut away at a further portion of its length along the other of said corners, a second abrasive means having a cylindrical periphery and having an axis parallel to the length of said guide, a portion of the cylindrical periphery of said second abrasive means extending into said guide through the further cut away portion thereof, means for rotating said abrasive means about their axes in such direction that the tops of said abrasive means move towards said guide and means for urging work pieces along said guide.

References Cited in the file of this patent

UNITED STATES PATENTS

| | | |
|---|---|---|
| 250,700 | Anderson | Dec. 13, 1881 |
| 593,067 | Gowen | Nov. 2, 1897 |
| 641,545 | Richmond et al. | Jan. 16, 1900 |
| 859,262 | Stewart | July 9, 1907 |
| 2,263,897 | Makenny | Nov. 25, 1941 |
| 2,288,125 | Douthitt | June 30, 1942 |